May 5, 1959 B. MARCELLUS 2,885,658
CODING DEVICE FOR COMPUTERS
Filed June 29, 1953 7 Sheets-Sheet 3

INVENTOR.
Brooks Marcellus
BY
ATTORNEYS

Fig. 10a. Coincidence Circuit

United States Patent Office 2,885,658
Patented May 5, 1959

2,885,658
CODING DEVICE FOR COMPUTERS

Brooks Marcellus, Rockford, Ill., assignor to Barber-Colman Company, Rockford, Ill., a corporation of Illinois Application June 29, 1953, Serial No. 364,891

10 Claims. (Cl. 340—174)

The present invention relates to a coding device and more particularly to means for preparing a data tape bearing information for feeding to a computer.

It is the primary object of the present invention to provide a coding device which is more accurate and more efficient than conventional machines of this type. It is an object to provide a coding device which substantially eliminates the effect of human error in the preparation of a data tape. It is a related object of the invention to provide a coding device which enables a high order of accuracy without strain or fatigue on the part of an operator. It is another object to provide a coding device which insures that the data recorded on the tape coincides with that which has been entered on the keyboard, substantially eliminating errors in the electromechanical system, even though such error may involve only one "bit" of the recorded data. It is a further object related to the foregoing to provide a procedure for preparing a data tape which checks each bit of information on the tape, not only for accuracy but also for the strength and clarity of the recording.

It is another object to provide a novel procedure for preparing a data tape which enables a high degree of accuracy to be achieved without the necessity for proof-reading the visual record of the recorded data.

It is an object of the invention to provide a coding device which produces a data tape accompanied by a printed record of the information recorded on the tape. It is another object to provide a recording device in which any error in the recorded data is immediately signaled to the operator and in which automatic erasure and correction may be effected simply by backspacing and restriking the correct key on the keyboard.

It is a further object to provide a coding device in which all trace of error is eliminated from the tape but in which the error and the subsequent correction thereof is distinctly set forth in the printed record. It is a related object to provide a coding device which permits data to be compactly recorded on a tape but which enables the printed data to be tabulated or spaced in convenient fashion on a simultaneously prepared printed record.

It is another object of the invention to provide a coding device which can accept and encode data at the highest speeds attainable on a manual keyboard and which is capable of reliable operation at even higher speeds when operated mechanically, for example, in connection with a Teletype receiver.

It is a further object to provide an improved coding device which automatically converts decimal digits, entered in sequence on a manual keyboard, into code groups of uniform length, each representing the binary equivalent of a given decimal digit. It is a related object to provide a coding device in which code groups are employed to represent both numbers and letters, and in which code groups are used with increased efficiency in the representation of information. It is another object to provide a novel shift-lock mechanism which insures against error when using the same code group to represent both a letter and a figure.

It is still another object of the invention to provide a novel means for converting from the so-called parallel representation of digits to the serial or sequential mode of representation.

It is an object of the invention to provide a coding device for preparing a data tape in which a novel ratchet mechanism is used to obtain advancement of the tape for the recording of a code group thereon each time a key is pressed and in step with the generation of the code group as well as for obtaining precise backspacing movement for the rerecording of a code group to correct an error in the tape.

It is another object to provide a device for preparing a data tape which does not require short-term storage of data prior to recording it on the tape.

Finally, it is an object of the invention to provide a coding device which is not only reliable, efficient and convenient to use, but which is straightforward and relatively inexpensive to contruct and to maintain.

Other objects and advantages of the invention will be apparent upon reading the following description and upon reference to the appended drawings, in which.

While the invention will be described in connection with a preferred embodiment, it will be understood that there is no intention of limiting the invention thereto but it is intended to include all modifications and alternative constructions and uses falling within the spirit and scope of the appended claims.

In general

Most high speed computers of the electronic type solve problems using the binary system of numbers. It is, however, convenient to feed information into a computer in the decimal system using a standard keyboard. It is also convenient to utilize a standard typewriter keyboard for feeding in information of a non-numerical nature.

Computers are known in which numerical data is entered on the standard keyboard and is transferred to a magnetic tape for feeding into a computer either immediately or at a convenient later time. The present device is an improvement over devices of this general type, and includes provision for making a printed record of all of the data entered on the keyboard as well as provision for checking the data recorded on the tape before it is fed into the computer proper.

Figures 1, 2:
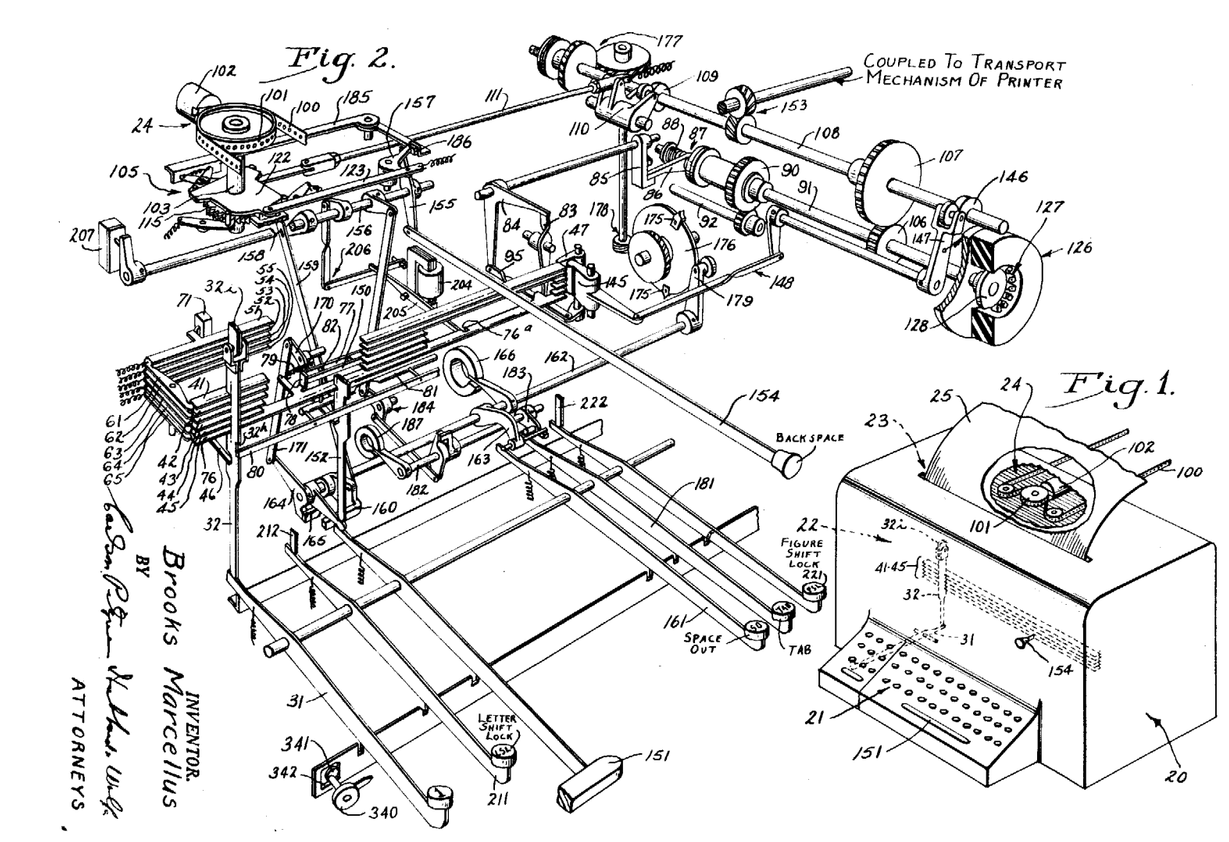
Figure 1 is a general perspective view of a coding device constructed in accordance with the present invention and including provision for printing as well as tape preparation.
Fig. 2 is a view in perspective of the electromechanical arrangement used in carrying out the present invention with certain parts omitted and certain parts broken away in order to simplify understanding.
Figure 3:
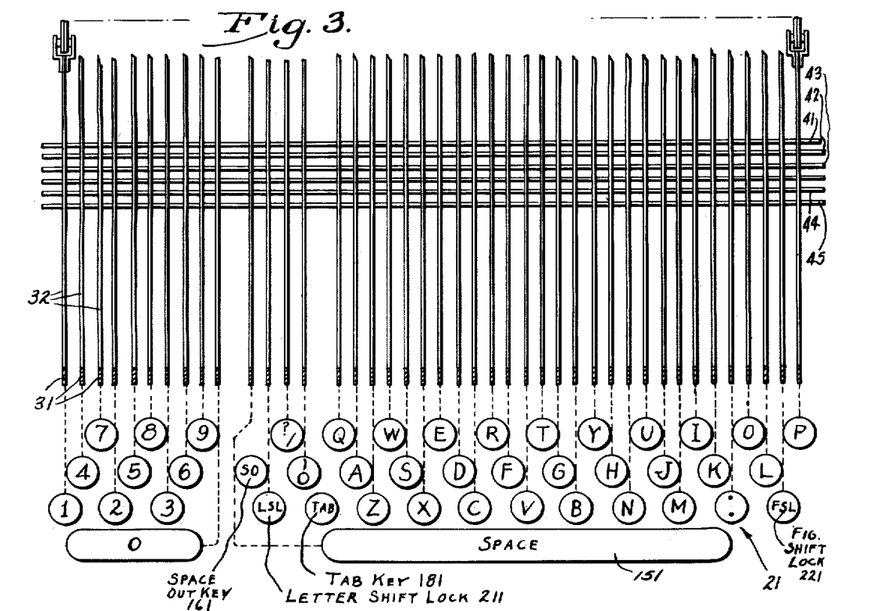
Fig. 3 shows diagrammatically the horizontal code bars and the vertical combination bars and the keys of the keyboard associated with the latter.

As shown in Fig. 1, the coding device indicated generally at 20 includes a keyboard 21, an internal electromechanical recording mechanism 22, and a printer 23, both of the latter being operated by the keyboard. The output of the recording mechanism appears at a magnetic recorder 24 while printed copy is produced on a sheet 25 which is fed in a continuous length. The keyboard 21 is divided into two parts. To the right is a conventional typewriter keyboard and to the left a numerical keyboard which may be of the well-known "Sundstrand" type.

Numerical data is entered on the numerical keyboard sequentially. The mechanism of the coding device includes code bars and associated switches. Upon operating one of the number keys, the switches are operated to set up predetermined combinations of polarities on sequentially arranged electrical contacts. These contacts are engaged in succession by a collector "arm." This collector arm is electrically connected to a recording head cooperating with the tape. Both the tape and the collector arm move in unison each time a key is depressed, with the result that spots of magnetism are recorded on the tape in accordance with the polarities set up by the code bars. Each decimal digit therefore may be represented on the tape by a code group consisting of sequentially arranged spots of magnetism.

In carrying out the present invention, data is represented on the tape by magnetic couples, rather than simple magnetic spots. The couples consist of two adjacent spots of magnetism of unlike polarity. For convenience, a north-south couple may be used to represent a binary 1, while a south-north couple represents a binary 0. This follows the scheme of representation which is employed in Patent No. 2,609,143 issued to George R. Stibitz on September 2, 1952. While the advantages of the couple mode of binary representation are rather fully set forth in the above patent, such advantages will be referred to from time to time as the discussion proceeds.

In carrying out the present invention each decimal digit is represented by a binary code group of corresponding magnitude. Thus, decimal 1 is represented by a binary 00001, decimal 2 by 00010, and so on. Simultaneously with the recording of data on the tape in binary form, a printed record of the decimal equivalent is made to provide a visible record for reference purposes.

The device to be described includes, in addition, means for carrying out a novel checking procedure. In this checking procedure the same data is entered on the keyboard, i.e., typed, a second time. This produces voltage couples in a predetermined sequence representative of the data. Simultaneously, the tape which has been previously prepared is "read" to produce a second series of voltage couples. The two sets of voltage couples are applied in synchronism to a coincidence circuit. Perfect coincidence indicates an accurate record. Upon lack of coincidence, error is indicated and the mechanism is automatically locked. The mechanism is freed upon pressing a backspace key and substituting the correct data.

*Keyboard and code bars*

For an understanding of the keyboard and code bar arrangement reference is made to Figs. 1 to 5, inclusive. Generally speaking, each of the keys in the present device is connected to a vertical combination bar. The combination bars engage a set of horizontal code bars. Both the combination bars and code bars are notched at the junction points, selected junction points being provided with wide notches to allow movement of certain of the code bars when a given combination bar is actuated. For a detailed description of operation of the code and combination bars employed herein, reference is made to Patent No. 2,196,354 which issued to Howard D. Colman on April 9, 1940.

In the practical device 42 data keys are used as follows:

| | |
|---|---|
| Letters | 26 |
| Figures | 10 |
| Shift | 1 |
| Punctuation | 3 |
| Letter lock-shift | 1 |
| Figure lock-shift | 1 |

The function of the above keys will be apparent to one skilled in this art except perhaps for the two lock-shift keys which will be covered later in the discussion.

In Fig. 2, for the sake of simplicity, only one data key, representing the numeral "1" has been shown, such key being indicated at 31. A vertical combination bar 32 extends upwardly from the rear end of the key 31 into edgewise engagement with five code bars 41 to 45, respectively, the latter being arranged one above the other as shown. The remaining combination bars of the set are arranged in similar fashion and parallel to one another as shown diagrammatically in Fig. 3.

Figure 4:
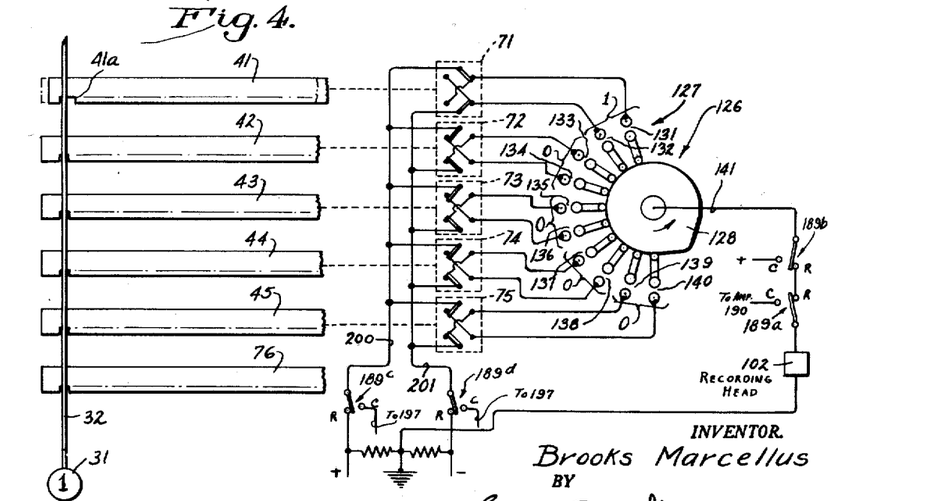
Fig. 4 is also a diagrammatic view of the code bars in profile showing the notches therein which engage the vertical combination bars. This view also shows the manner in which the code bar switches are connected to the collector.
Figure 5:
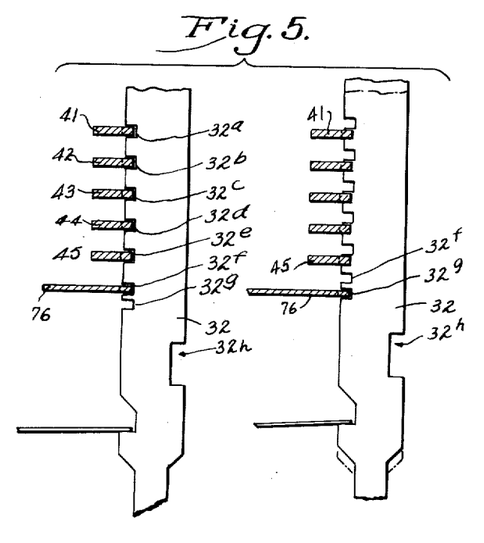
Fig. 5 shows a combination bar in both its normal and its upraised position.
Figure 6:
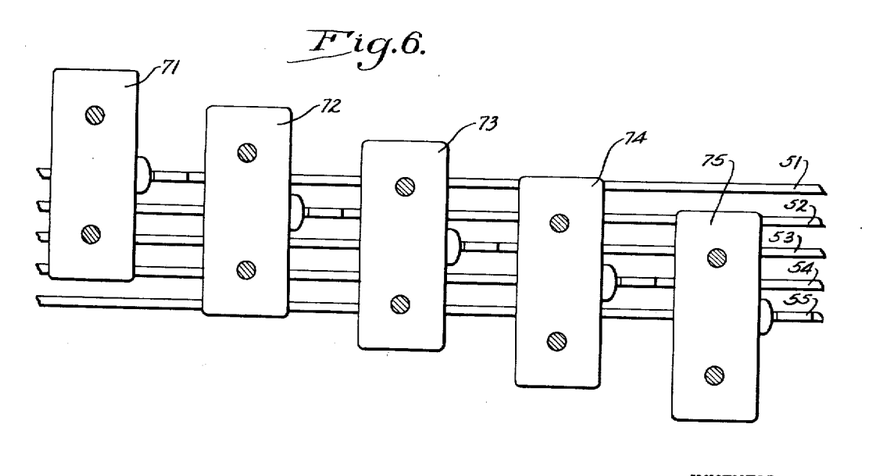
Fig. 6 shows the switch bars and the arrangement of the associated switches.

Each of the code bars is notched to receive the combination bars as shown diagrammatically in Fig. 4. In addition, each of the combination bars is notched to receive the horizontal code bars as shown in Fig. 5 and is biased into a normal lowered position by a suitable spring 46. Thus, as long as no key is depressed each of the bars is free to slide relatively to the remaining bars. Movement of the code bars is, however, temporarily prevented by a stop 47 which is located at the right-hand end of the code bars.

The effect of pressing a key is shown in Fig. 4. Here it will be noted that one of the code bars, in this instance code bar 41, is provided with a wide notch 41a at the point of intersection with the combination bar 32. Thus, upon releasing the stop 47, the code bar 41 is free to shift laterally through the width of the notch when the key 31 is depressed, while all of the other code bars are locked in place. As the discussion proceeds it will be seen that pressing any given key performs the functions of (1) locking all of the code bars which do not have wide notches at the key position and (2) releasing the stop 47 so that the wide notched code bars may move to the right in predetermined combination.

Prior to discussing the mechanism for releasing the code bars, reference will be made to the switch bars which are located opposite the code bars and which are indicated by the numerals 51 to 55. The code bars and switch bars are interconnected by rocking levers 61–65, inclusive, to which tensile springs are connected as shown. Switch bars 51 to 55 have switches 71–75 associated therewith. These switches are, as will later be seen, of the double-pole, double-throw type for establishing either plus-minus or minus-plus voltage couples.

Arranged parallel with the code bars is a release bar or "sixth" code bar 76. This release bar performs a number of functions. Its first function is to trigger the mechanism so that the code bars may move and so that the information thereon may be recorded on the tape. The second function is to lock the combination bar corresponding to the depressed key in the uppermost position and the remaining keys in the lowered position until the recording operation has been completed. To understand the locking operation reference is made to Fig. 5 which shows the combination bar 32 both at rest and upraised. It will be noted that the combination bar, in addition to having notches 32a–32e respectively, has notches 32f and 32g. The latter engage the release bar 76 alternatively. When the combination bar 32 is upraised the lower one of the two notches is engaged and the bar is held in the upraised position from the time that the release bar begins to move until it returns to its normal position.

Figure 9:
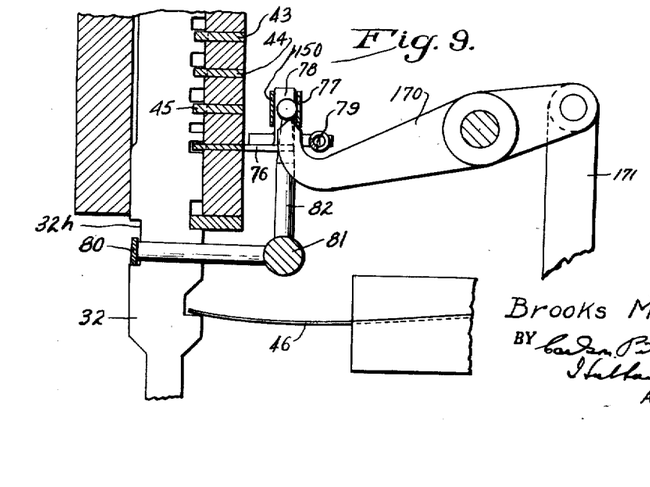
Fig. 9 shows the mechanism for disabling the latch for the release bar.

Means are provided for normally latching the release bar 76 in its left-hand position, as shown in Fig. 2. The latching is provided by a stationarily mounted latch 77 in the form of a flat leaf spring. The left hand or free end of the spring abuts a lug 78 which is integrally formed on the release bar. Thus, the release bar is prevented from moving to the right under the urging of the coil spring 79 which is associated therewith. However, when the key 31 is depressed, the latch is released. For this purpose, the combination bar 32 has a lost motion connection with a trip bar 80 (see Figs. 2 and 9), the trip bar fitting into an elongated notch 32h. The trip bar is pivoted for broadwise movement on a shaft 81 which has a latch-releasing rod 82 extending upwardly therefrom. Thus, when the key is fully depressed, the trip bar is engaged and the latch-releasing rod 82 deflects the latch spring 77 rearwardly. The release bar is, thereupon, free to slide to the right under the urging of the spring 79.

At the right-hand end of the release bar is a release lever 83 which engages a bell crank 84, preventing the latter from rotating. Mounted for rotation with the bell crank 84 is a rotatable latch 85 which controls a single step-driving mechanism. Such mechanism is in the form of a single revolution clutch 87 termed an "F" clutch. The clutch is controlled by releasing a release member or bolt 86, the bolt 86 being tensioned in a counter-clockwise direction by a spring 88. The clutch is so constructed that when the bolt 86 rotates counterclockwise the clutch is triggered or energized to rotate through a single complete revolution. The construction of the clutch 87 is set forth in some detail in Patent No. 2,232,166 issued to Howard D. Colman on February 18, 1941, under the heading clutch release. For the present it will suffice to say that the clutch 87 has an input gear 90 and an output shaft 91. Power is transmitted to the input gear 90 by a constantly rotating drive shaft 92.

Figure 7:
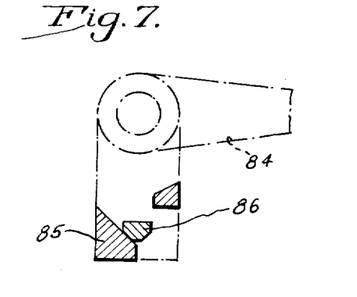
Fig. 7 shows the profile of the faces of the latch and clutch bolt.

The mating surfaces of the latch 85 and bolt 86 are tapered as shown in detail in Fig. 7. Consequently, when the latch 85 is released for rotation, it is cammed out of the way by the descending bolt 86, causing rotation of the bell crank 84. At the lower end of the bell crank 84 is a link 95 which is connected to the stop 47 for rotating the stop into an out-of-the-way position. This enables the code bars to move endwise in predetermined combination, the combination depending upon which one of the the combination bars has been actuated.

The effect of moving the release bar 76 may be summarized briefly as follows: The release lever 83 at the right-hand end thereof is rotated counterclockwise. The bell crank 84 then rotates clockwise under the urging of the swinging bolt 86 and its connected spring 88. The link 95 moves rearwardly, moving the stop 47 clear of the ends of the code bars, the code bars then moving to the right in predetermined combination, causing the switches 71–75 to set up predetermined combinations of voltages. Simultaneously, the "F" clutch 87 causes the shaft 91 to rotate through one complete revolution. The rotation of the shaft 91, as will be seen, causes the tape to be advanced one step and also causes the data to be recorded on the tape in unison with its advancement.

Advancement of tape

Turning attention now to the means for advancing the tape, it will be noted that the advancing elements lie in the upper portion of Fig. 2. The recording medium itself is in the form of a tape 100 mounted on a sprocket 101 and having a recording head 102. The recording head may be used for either recording a signal on the tape 100 or for reading signals which have been previously recorded on the tape. Such recording head may, for example, be of the type described in Patent No. 2,609,193 of George R. Stibitz which issued on September 2, 1952. The sprocket 101 is mounted on a shaft 103 which is advanced in steps by a ratchet mechanism 105.

The ratchet mechanism 105 is driven from the output shaft 91 of the "F" clutch 87. Such driving takes place through a pair of gears 106, 107, the latter being connected to a cam shaft 108. This shaft has a cam 109 and cam follower 110 to which is connected a ratchet rod 111. The ratio of the gears 106, 107 and the contour of the cam 109 are so arranged that the ratchet rod executes a power stroke and a return stroke during a complete rotation of the shaft 91.

Figure 8:
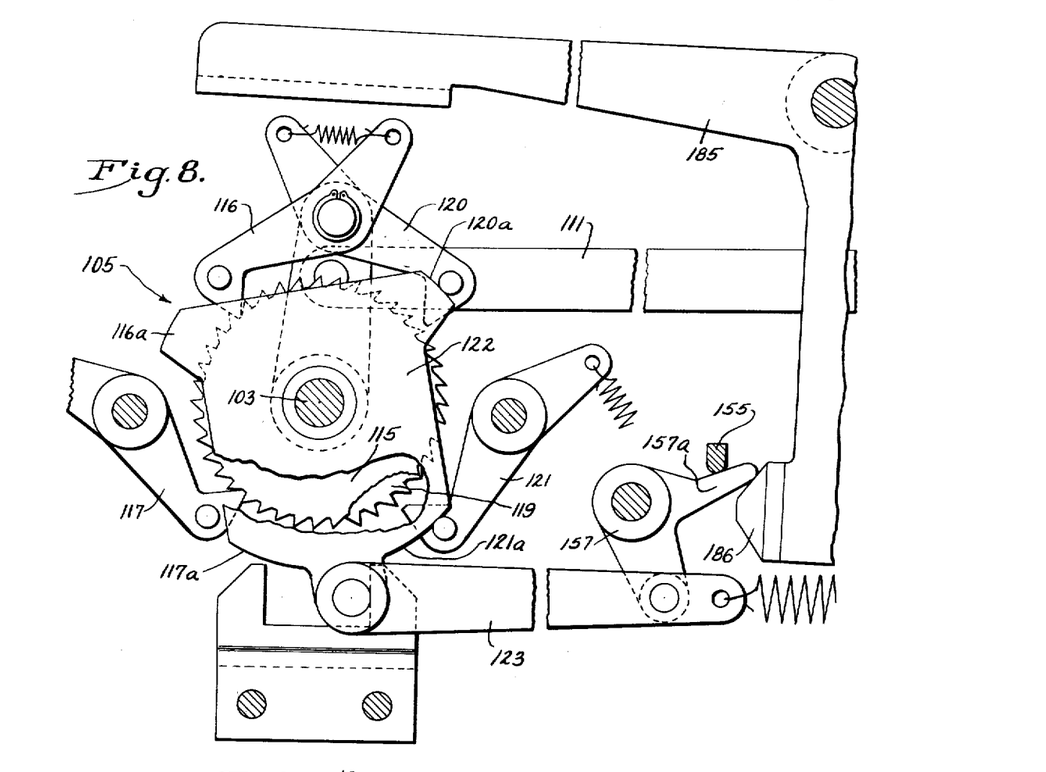
Fig. 8 is a plan view of the novel ratchet mechanism used in the present invention.

For the purpose of forwardly advancing the tape, the ratchet mechanism 105 is constructed as shown in Fig. 8. Here it will be noted that the ratchet mechanism has a forward ratchet wheel 115 having a forward pawl 116. Retrograde movement of the ratchet wheel 115 is prevented by a forward stop 117. In operation, movement of the ratchet rod 111 to the left causes the ratchet wheel to be stepped forwardly through an angle corresponding to one ratchet tooth. This rotates the shaft 103 causing the tape 100 to be moved in the forward direction in an amount corresponding to one code group of data.

In accordance with one of the aspects of the invention, the ratchet mechanism 105 has provision for reversal for the purpose of correcting any error that may inadvertently be recorded on the tape 100. Such reversal is accomplished by providing a reverse ratchet wheel 119, a reverse pawl 120, and a reverse stop 121, together with a cam plate 122. As shown, this cam plate includes four cam surfaces 116a, 117a, 120a, and 121a. With the cam plate 122 arranged as shown in Fig. 8, the pawls 116, 117 are active, and forward rotation of the ratchet wheel 115 may take place. Under such conditions the reverse pawls 120, 121 are disengaged by the correspondingly numbered cam surfaces. When the cam plate 122 is rotated in clockwise direction by a ratchet control rod 123, the opposite situation obtains so that the shaft 103 and tape 100 are rotated one step in the reverse direction. Such reverse movement will again be referred to in connection with backspacing. When the cam plate is in its central position both ratchet wheels are locked, for a purpose which will become clear as the discussion proceeds.

Operation of collector

In carrying out the present invention, means are provided for setting up a series of voltage couples corresponding to the data which is entered on the keyboard and for causing such voltage couples to be recorded serially on the tape in the form of corresponding couples of magnetism. Where it is desired to represent a decimal digit, the voltage couples and the magnetic couples are poled so that they represent a code group in the binary system of numbers. For convenience, the code group consists of five magnetic couples. A five-digit code group is also used for representing letters but in the latter case the representation is arbitrary. The number of possible combinations using a five-digit code group is the fifth power of 2, or 32. As previously stated, the present device employs a total of 42 data keys. Provision is, however, made for employing the same code group to represent both a letter and a number of employing figure-shift and letter-shift keys. The presence of a shift character, or code group, on the tape determines whether the following code groups are to be interpreted as numbers or as letters by the apparatus in which the tape is utilized. This shift mechanism will be discussed in detail in a subsequent section.

For setting up the code groups, the switches 71–75 associated with the code bars are connected to a collector 126 which is driven by the collector shaft 91. The collector 126 includes a series of ten switches 127 which are actuated in sequence by a collector arm, which in the present instance is a cam 128. The switches are closely spaced so as to occupy an arc of 180 degrees. The specific arrangement of the series of switches 127 in the collector is shown in Fig. 4 where the collector switches have been designated 131–140, inclusive. These switches are connected to the double-pole, double-throw switches 71–75, which, as shown in Fig. 4, are normally connected to a source of positive and negative voltage. It will be noted in this figure that the polarities set up on the switches 131–140 correspond to five voltage couples. In the present instance it is assumed that the decimal 1 key has been depressed. As a result, the code bar 41 moves to the right, causing the polarity of the output to be plus-minus. The other code bars remain stationary so that the polarity of their output continues to be minus-plus. Consequently, when the cam 128 sweeps past all the switches 131–140, the voltage couples appear on an output line 141 in sequence. In sequence, these voltage couples are applied to the recording head 102 which records the voltage couples on the tape 100 as couples of magnetism. The recording amplifier may be the same as that set forth in the above Stibitz patent. After the five-digit code group has been recorded on the tape 100, the remaining half revolution of the shaft 91 serves to retract the ratchet rod 111 so that the pawl connected thereto is in a retracted position ready for the next advancing movement.

After a code group corresponding to a single decimal digit has been recorded on the tape 100, all the code bars are reset into their left-hand position in readiness for the pressing of another key. This is accomplished by a reset lever 145 which engages the ends of the code bars. This reset lever is operated by a reset cam 146 and cam follower 147 through a reset linkage 148. The profile of the reset cam is so arranged that resetting of the code bars takes place after all of the potentials have been collected in the collector 126 and while the ratchet rod 111 is being retracted. The code bars 41–45 are held in their reset or latched position by the stop member 47 which swings in behind them.

It is to be noted that the reset lever not only acts upon the code bars 41–45 to move them to the left but also acts upon the release bar 76 or "sixth code bar" serving to latch the lug 78 thereon behind latch 77. The release bar 76 is located in a downwardly offset position relative to the stop member 47 (Fig. 2). Consequently the release bar is free to move endwise when its latch 77 is triggered to set in motion the chain of events which results, as covered above, in the operation of the single-revolution clutch and the releasing of the code bars.

It is, of course, possible that the operator may not have removed his finger from the depressed key on the keyboard in time to reset the latch 77 and thereby to hold the release bar in its left-hand position. In order to take care of this contingency, an auxiliary latch spring 150 is provided which is arranged parallel to the latch spring 77 and on the opposite side of the latch-releasing rod 82. Thus, in the event that the latch 77 is held out of engagement with the lug 78 by the rod 82, the auxiliary latch 150 takes over to hold the lug 78 and the release bar in its left-hand position. When the key is subsequently released by the operator, return of the rod 82 causes the latch 77 to be moved back into its latching position and, further, causes the auxiliary latch 150 to move backwardly into the inoperative position illustrated in Fig. 2. Using the mechanism thus far described, it is possible for an operator by pressing the keys of the keyboard in sequence to record on the tape 100 a compact series of corresponding code groups in the binary system.

The foregoing assumes that all of the information will be entered on the tape without interposing any spaces. It is desirable, however, to be able to record on the tape 100 a code group which is indicative of a space. For this purpose, a space key 151 is provided which is connected to a space combination bar 152. The latter is notched in much the same way as the combination bar 32 previously referred to. That is to say, the code bars are provided with wide and narrow notches in order to cause predetermined ones of the code bars to move to the right when the space key 151 is depressed. Operation of the device takes place in the same manner as discussed in connection with the key 31, the only difference being that the data recorded on the tape is in the form of a code group which is arbitrary and which is interpreted as a space by the computer which receives and reads the tape 100.

*Printing of data*

The data is printed simultaneously with its recording on the tape 100. For this purpose I prefer to use the type-forming printer disclosed in Colman Patent No. 2,196,354. In accordance with the disclosure of this patent, printing takes place by a novel printing element which includes a series of thin flatly stacked strips, each of these strips having a plurality of equally spaced facets. In forming a character, the strips are adjusted with respect to one another so that the facets outline the same character repeated the width of the page. Each of the keys on the keyboard causes the strips to assume a different relative positioning, the positioning being determined by the selective action of drive bars 15, as shown in Fig. 2 of the above Colman patent. In utilizing the printer shown in the Colman patent, each of the drive bars is connected to the corresponding combination bar. In the case of the combination bar 32, for example, the drive bar is indicated at 32i in the attached Fig. 2.

After a particular character has been set up for printing, means are provided in the printer for making the printed impression and for transport to the next position in readiness for the pressing of a subsequent key. In using the printer in the present coding device, the stopping or transport mechanism in the printer is coupled directly to the clutch-operated drive shaft 91 (Fig. 2) so that stepping from one position to the next occurs each time that the single revolution clutch 87 is operated. This is important to keep in mind since, in the operations of "space-out" and "tab" to be discussed, it is necessary for the stepping mechanism to recycle to produce a "block" of spaces in the printer even though the space combination bar only operates once incident to these two operations.

In order to couple the present device to the stepping or transport mechanism in the printer shown in the Colman Patent 2,196,354, it is sufficient to couple the shaft 108 to the shaft 9b (Colman patent, Figs. 2, 3 and 16) by a pair of spiral gears having a 1:1 ratio. Such coupling mechanism is shown at 153 in the attached Fig. 2. When this is done the normal drive of the shaft 9b through gear 6 in the Colman patent must, of course, be disconnected.

Preferably, a distinctive character is printed on the sheet to indicate that a space has been entered on the keyboard. While the printer disclosed in the Colman patent has, for the sake of simplicity, been omitted from the drawings, it will be understood that the disclosure of the Colman patent is included herein by cross reference. It will be apparent that the invention is not limited to any particular printer but may be used with other printers having printing elements capable of being actuated by the combination bars of the present device and in which stepping or transport from one space to the next may be caused to take place step by step upon each operation of the clutch 87.

*Backspacing*

The use of a backspacing key on a typewriter is, of course, standard. In accordance with the present invention the back spacing key is used to backspace the tape in order to correct an error on the tape without, however, causing backspacing on the printed record.

The typing of an incorrect character as well as the correct substituted character is thus indicated on the printed record. For the purpose of backspacing, a backspace key 154 is provided which is connected to the ratchet control rod 123 by means of a backspace lever 155, a shaft 156, and bell crank 157. Depression of the backspace key causes the ratchet pawls to be set for reverse movement of the tape. At the end of the movement of the backspace key, as provided by a lost motion connection 158, a backspace link 159 is drawn upwardly. This causes a one-way coupling 160 to move the space combination bar 152 upwardly. The latter raises the trip bar 80 which releases the latch 77, causing the release bar 76 to move to the right. This initiates rotation of the "F" clutch 87, causing reciprocation of the ratchet rod 111. Since the ratchet mechanism 105 has been conditioned for reverse rotation, the tape will move backwardly one step.

During such backward movement, magnetic couples corresponding to a "space" will be recorded on the tape. This is, however, immaterial since any data recorded on the tape during the backward movement is automatically erased and replaced by the magnetic couples forming the correct data when the next key is pressed on the keyboard.

The pressing of the backspace key does not cause backspacing of the printing carriage as in the case of the conventional typewriter. Instead, pressing the backspace key causes cycling of the drive clutch 87 and therefore operation of the stepping or transport mechanism in the printer. A space is therefore indicated in the printed record. The original erroneous figure is thus left on the record and indicates to anyone reading the printed record that an error has occurred and that such error has been corrected by entering on the keyboard the next following character. This avoids overprinting or obliteration of data on the printed record.

*Space-out feature*

In using the present tape preparing device to feed data to a computer, it is frequently necessary to set up "blocks" of information on the tape. Since the program followed by any computer is very definitely set up, these blocks must always be of the same length, even through the amount of information may vary in length. In order to fill out a block of information a space-out key 161 is provided, together with associated mechanism for recycling the space combination bar and for stopping such re-cycling automatically when the block is completed. The effect is the same as pressing the space key 151 repeatedly to fill out the block.

The manner in which the re-cycling occurs will be apparent upon inspection of Fig. 2 where it will be noted that the key 161 causes rocking of a space repeat shaft 162 by means of a lever 163 mounted on the shaft. At the left-hand end of the shaft 162 is a lever 164. During the course of counterclockwise rocking movement the lever 164 engages a dog 165 which, in turn, engages the lower end of the space combination bar 152. This causes tripping of the trip bar 80, releasing of the latch 77, and movement of the release bar 76. The effect of this is two-fold: First of all, the appropriate voltage couples are set up on the collector 126 to indicate a space and the "F" clutch is tripped so that corresponding magnetic couples are entered on the tape 100. After a single recording cycle has been completed, the release bar 76 returns to its normal left-hand position.

In accordance with the present invention, means are provided for disabling both the latch 77 and the auxiliary latch 150 so that the spacing cycle is repeated. In the present instance, this is accomplished by providing a detent in the form of a magnet 166 for maintaining the space repeat shaft in the operating position and by maintaining the auxiliary latch 150 out of engagement with the lug 78 on the release bar. The latter function is accomplished by a latch-disabling member 170 (see Fig. 9) which is connected to the lever 164 by a link 171. The end of the latch-disabling lever 170 is wedge-shaped so that the latch springs 77, 150 are wedged apart away from the lug 78 and therefore ineffective. As a result, the release bar is not maintained in its left-hand position after a single cycle, but is free to proceed to the right, following up the reset lever 145. This causes tripping movement of the release lever 83 and initiates another space cycle.

In order to terminate the cycle at the end of a predetermined block of information, means are provided for overcoming the magnetic detent 166. In the present instance, this is accomplished by tabular stops 175 which are mounted on a tabular disk 176. The disk is rotated slowly through a double worm reduction 177, 178. Arranged in the path of the tabular stops 175 is a follower 179. Re-cycling of the space combination bar occurs until one of the stops 175 strikes the follower 179. This overcomes the magnetic detent 166 and restores the space repeat shaft 162 to its neutral position. This restores the effectiveness of the latch springs 77, 150 so that the mechanism is latched in readiness for succeeding data recording steps.

*Tabulation of printed data*

As a result of the space-out described above the automatic cycling of the space combination bar not only records code groups indicative of spaces on the tape 100, but also "prints" spaces on the printed record. Under some circumstances it may not be necessary to employ the space-out, but it may, nevertheless, be desirable to arrange the printed information in tabular form on the printed data sheet. For this purpose means are provided for disabling the ratchet mechanism 105 so that data is not recorded on the tape during the tabular "gaps." To accomplish this, a tab key 181 is employed which not only rocks the space-repeat shaft into its operative position, but also operates a tape-arresting shaft 182. Movement is transmitted to the latter shaft by means of a lever 183 which is similar to the lever 163 referred to above. Movement of the shaft 182 is transmitted to the shaft 156 by a tape-arresting linkage 184. The latter is so arranged as to produce rotation of the bell crank 157 which is just half that which is produced by the backspace key 155. The effect of this is to move the ratchet control rod 123 to its mid position. This rotates the cam plate 122 to its central or locking position which allows both locking pawls to drop into engagement with the ratchet wheels.

The advancing and reversing pawls are simultaneously disabled by a disabling lever 185 (see Fig. 8). This lever is rotated counterclockwise by means of a cam 186 which is engaged by the bell crank 157. With the arm 157a of the bell crank centered on the cam 186, the lever 185 presses downwardly on the two pawls 116, 120, spreading them apart and forcing them away from the associated ratchet wheels. The linkage is maintained in this disabling position by a magnetic detent 187 on the shaft 182 and the tape remains stationary.

As a result of the foregoing, re-cycling of the space combination bar continues, causing a space to be printed by the associated printer during each cycle but without movement of the tape. Such re-cycling continues until one of the tabular stops 175 is rotated around into engagement with the follower 179. This overcomes both magnetic detents 166 and 187 and restores the space-repeat shaft 162 and the tape-arresting shaft 182 to their normal positions. The "tabbing" of the printer is then complete and the printer is ready for the entering of additional data on the keyboard.

*Automatic check feature*

The result obtained by a computer cannot be any more accurate than the data on the data tape. Various means have been proposed for checking the data on the data tape. In accordance with one aspect of the present invention, a novel checking procedure is provided in which the data entered on the tape is typed twice. During the first typing step, the typed data is simultaneously printed and recorded on the tape as described above. In the second or "check typing" step no data is recorded on the tape. Instead, the data previously recorded is read from the tape in synchronism with the second typing. Voltage pulses generated during the second typing and those read from the tape are compared for coincidence. Lack of coincidence indicates that an error has been made and the device is immediately disabled so that the error may be corrected.

Figure 10:
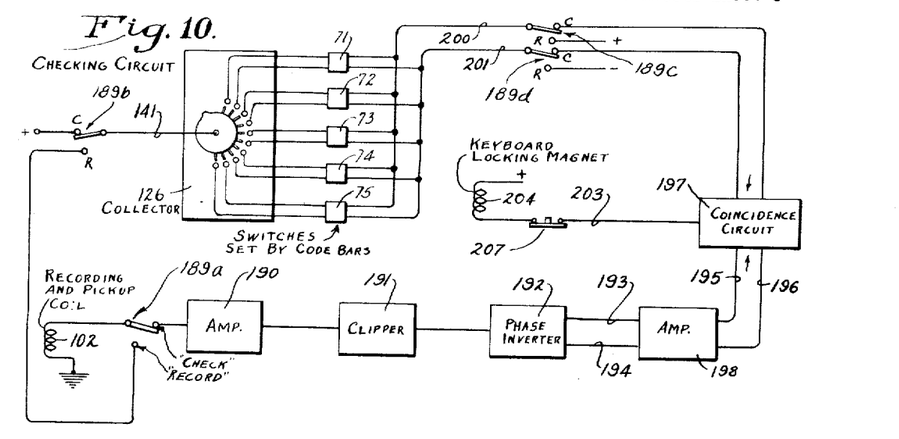
Fig. 10 is a block diagram showing the means used for checking the accuracy of the data recorded on the tape.

The arrangement used for checking the data and locking the device in case of error is shown in Fig. 10, which figure should be viewed in connection with Figs. 2 and 4. The circuit which is used for checking is set up by a record-check switch 189. This switch is of the four-pole, double-throw type having poles 189a–189d. When the switch is set in the "check" position the recording head 102 is utilized as a pickup head and the collector 126 becomes a distributor for distributing positive pulses to the switches 71–75 which, in turn, produce the pulses required for checking.

During checking the output of the pickup head is fed into an amplifier 190 and a clipper 191 which determines the magnitude of the voltage pulses. The voltage pulses are then fed into a phase inverter 192 having dual output lines 193, 194. The inverter may be of conventional design, and so arranged that the original positive pulses appear on the output line 193, while positive pulses timed with the original negative pulses appear on the output line 194. The pulses are further amplified in a conventional push-pull amplifier 198 and are fed by output leads 195, 196 to a coincidence circuit 197.

The positive pulses on leads 195, 196 represent the information read from the tape. In carrying out the invention a corresponding signal is produced by the code bars which are operated by the manual keyboard. To obtain a signal from the code bars which is suitable for comparison with the signal obtained from the tape, a positive voltage is applied to lead 141 of the collector 126. This positive voltage is applied consecutively to the contacts 131–140 which are connected to the DPDT switches 71–75. Thus, trains of positive pulses are obtained on leads 200, 201, which should coincide exactly with those on leads 196, 195 respectively.

The coincidence circuit 197 is so arranged that the output voltage on a line 203 is zero as long as the input pulses are in exact coincidence with one another. However, upon lack of coincidence a voltage appears at the output line 203. This output line is connected to a keyboard locking magnet 204 (see Fig. 2). The armature of the locking magnet operates a locking lever 205 which engages a notch 76a provided in the release bar 76. Thus, when any error is indicated by the checking circuit of Fig. 10, the release bar is prevented from further movement and the keyboard is inoperative.

Figure 10A:
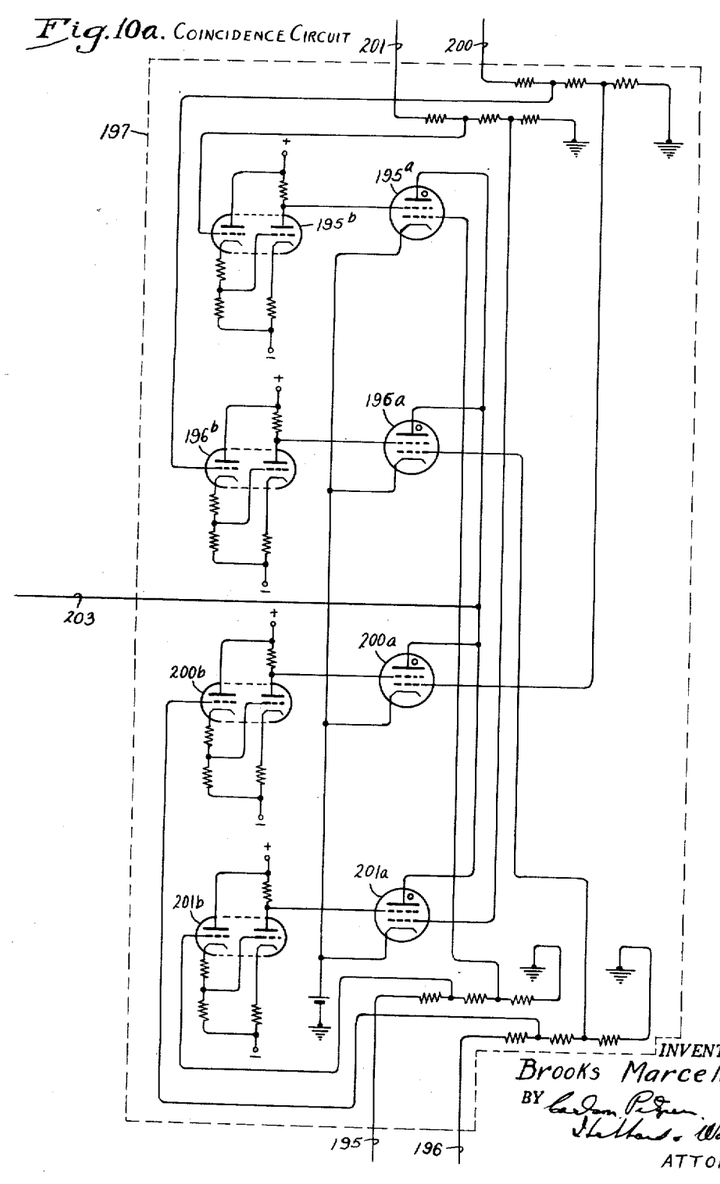
Fig. 10a is a schematic of the coincidence circuit used in Fig. 10.

The coincidence circuit 197 may take various forms, the only requirement being that the coincidence criteria outlined above are satisfied. The preferred form of circuit, which is shown in Fig. 10a, employs four dual-grid gaseous rectifiers 200a, 201a, 195a and 196a. The first grid of each of such rectifiers is connected to the correspondingly numbered input line. The second grid in each rectifier is coupled to the corresponding "opposite" input line as shown. Means are provided for inverting the signals applied to each of the second grids. Because of the inversion a positive input voltage appears as a negative voltage on the second grid. Thus, under conditions of coincidence a positive voltage on the first grid is exactly offset by the negative voltage applied to the second and no current flows through the tube. Inversion is accomplished by inverters 200b, 201b, 195b and 196b. A twin triode is used for each of the inverters and connected as shown in Fig. 10a. The circuit is so arranged that the output of a given inverter is at ground potential during no-signal conditions and swings below ground when a positive input pulse arrives on the corresponding input line.

It will be apparent to one skilled in the art that as long as the positive pulses arriving at input lead 201 correspond with those arriving at input lead 195 and as long as the positive pulses on input lead 200 coincide with those arriving on input lead 196, conduction will not take place in any of the gaseous tubes. However, upon lack of coincidence current will flow in the output lead 203 which is sufficient to operate the keyboard locking magnet 204.

In order to free the keyboard it is necessary for the operator to press the backspace key 154. A switch 207 is arranged to be operated whenever the backspace key is pressed. This switch is of the normally closed type and acts to cut off conduction of the gaseous rectifiers, thereby freeing the keyboard locking magnet 204. Pressing the backspace key 154 also rotates the shaft 156 (Fig. 2), operating the linkage 206 which insures that the armature of the locking magnet is restored to its open position.

Figures 11, 11A:
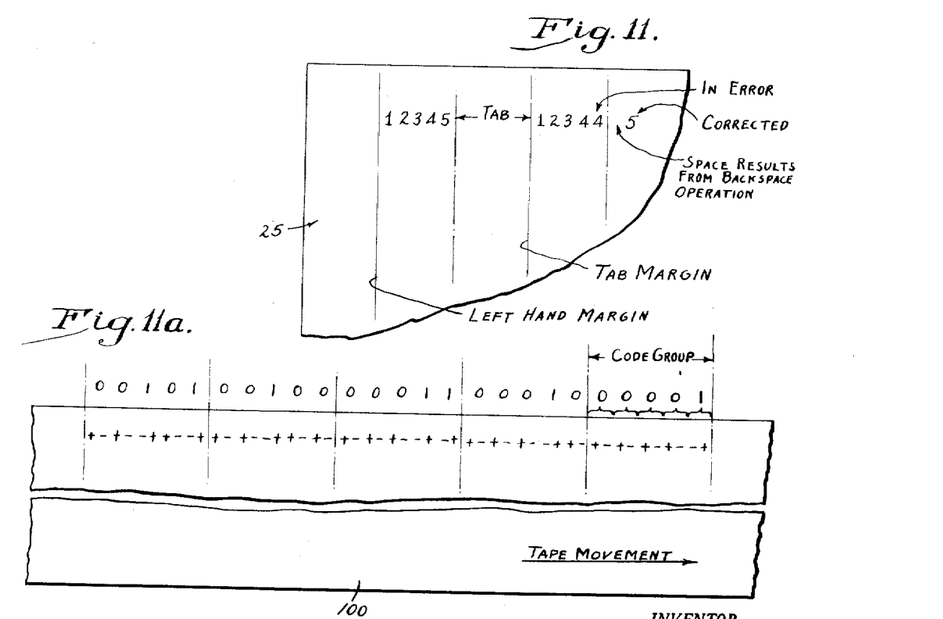
Fig. 11 shows a fragment of printed record with the data in tabular form.
Fig. 11a shows a short section of tape corresponding to the first group of digits on the printed record.

In order to correct an error on the tape, the switch 189 is thrown into the "record" position, and the correct key is operated on the keyboard. The switch 189 is then restored to the "check" position and the remainder of the data recorded on the tape is checked for accuracy. In the event that the operator should fail to throw the switch 189 into the "record" position for correction of the error on the tape, automatic locking will simply be repeated and the operator will not be able to get beyond the point of error until the correction has actually been entered on the tape.

Where the keyboard is locked by reason of error in the check-typing, it is not necessary for the operator to throw the switch 189 into the "record" position. The back-space key 154 is, however, pressed to free the mechanism, after which correct check-typing may be resumed. The appearance of the printed record resulting from the second typing is shown in Fig. 11. Here the record indicates that the last number in the second column was typed in error and that the error has been corrected. The printed record appears the same regardless of whether the error is made in the original recording on the tape or during the check-typing.

The data on the tape corresponding to one of the groups of figures is shown in Fig. 11a, the north and south poles of magnetism being indicated by the plus and minus signs, respectively. Since the tape movement is to the right the code groups appear in this figure from right to left.

*Shift-lock mechanism*

It is one of the features of the present device that a short five-digit code group is employed. Normally it would be expected that the data which may be represented by the code groups would be restricted to 32 combinations. In the present device, however, 42 data keys are employed, and additional keys may be added to this number for added versatility, for example, added punctuation, mathematical symbols and the like. This is accomplished by providing a shift-lock key for figures and a second shift-lock key for letters, together with a novel locking arrangement.

Referring to Fig. 2, the letter shift-lock key is indicated at 211. This key operates a letter-shift combination bar 212, which extends upwardly into engagement with the code bars 41–45. The combination bar 212 differs from the combination bar 32 previously described only in the respect that it is differently notched so as to set the code bars 41–45 in an arbitrary combination which is recorded on the tape in the form of a unique letter-shift code group. The existence of the letter-shift code group on the tape serves as indication that all of the code groups following are to be interpreted as numbers rather than as letters. This makes it possible to employ the same code group for both letters and figures, and serves almost to double the number of possible bits of data which may be represented by a five-digit code group. In order to shift back into figure representation, a corresponding figure shift-lock key 221 is used having a combination bar 222. The latter is arbitrarily notched so as to set up on the tape a unique code group indicating that a figure-shift operation has taken place, and that all subsequent characters are to be interpreted as figures.

In accordance with one of the aspects of the invention the keys 211, 221 are utilized for the additional purpose of locking selected keys on the keyboard. Thus, a novel locking mechanism is provided which is so arranged that (1) when the letter shift-lock key 211 is depressed, all of the figure keys are positively locked and inoperative, and (2) when the figure shift-lock key 221 is depressed, all of the letter keys are locked and inoperative.

Figure 12:
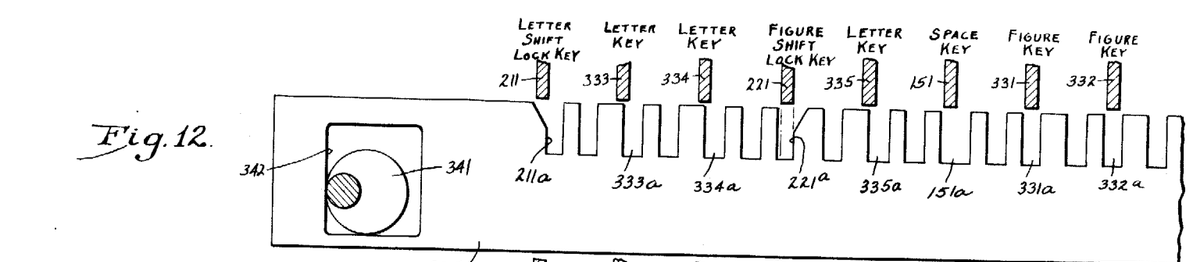
Figs. 12–15 show the key locking mechanism in its respective positions as follows: "figures only," "letters only," "all locked" and "all freed."
Figures 13, 14:
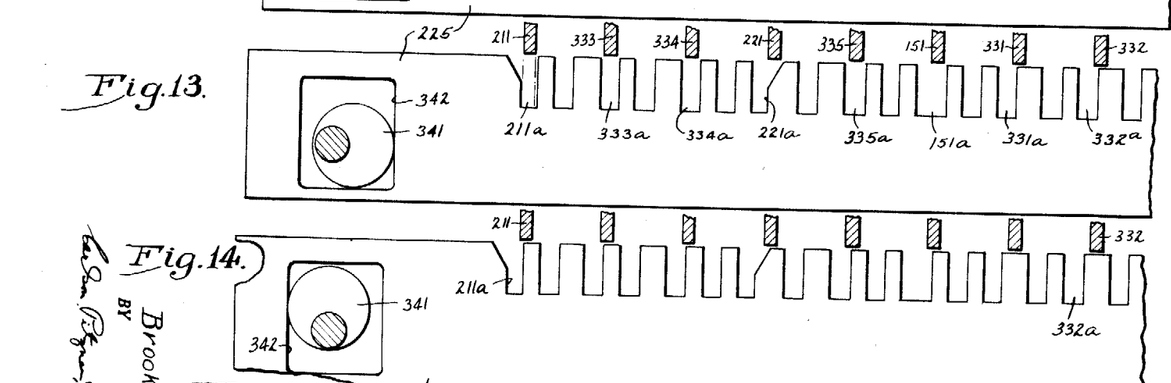

This is accomplished by providing a novel locking bar 225 which is arranged transversely in the path of movement of the key arms as shown in Fig. 2. The locking bar is movable between first and second positions and sets of notches are formed in its upper edge which are used selectively for letters and figures. The first and second positions of the locking bar are shown in Figs. 12 and 13, respectively. To make the invention more easily understood only a portion of the keys have been shown. Thus letter keys are indicated at 331, 332 and 333 and figure keys are indicated at 334 and 335.

Referring to Fig. 12, a first set of notches 331a, 332a is provided for the respective figure keys. The notches are in alinement or register with the figure keys so that the figure keys may be used in the normal fashion while the letter keys are locked. Conversely, as shown in Fig. 13, notches 333a—335a are provided for the letter keys and are brought into register with the letter keys when the locking bar is shifted to its second position. In such position the figure keys are locked but the letter keys are operable.

In practicing the invention, the shift-lock key 211 is employed to shift the locking bar from the "figures only" position of Fig. 12 to the "letters only" position of Fig. 13. This is accomplished by providing a notch 211a having a sloping side wall. Thus, when the key 211 is depressed the locking bar tends to be cammed to the left, freeing the letter keys and locking the figure keys. Conversely, the shift-lock key 221 is provided with a notch 221a having a sloping side wall 221b which is oppositely facing. When the shift-lock key 221 is pressed, the locking bar is thus cammed to the right to restore the condition shown in Fig. 12.

Should it be desired to lock the entire keyboard, it is sufficient to move the locking bar 225 to the left an additional amount, thereby taking all of the notches out of register with their corresponding keys, as shown in Fig. 14. In the present device, such additional shifting movement is provided by a manual operator 340 (see also Fig. 2) having a cam 341 which engages the walls of an aperture 342 formed in the locking bar. Lost motion is provided between the cam and the walls of the aperture so that when the manual control is moved into the position shown in Figs. 12 and 13 the locking bar may move through a limited range under the control of the shift-lock keys 211, 221. However, when the manual control is rotated through 90° so that the lobe of the cam 341 faces upwardly, the locking bar 225 is drawn to the left and all of the keys are locked as in Fig. 14.

Figure 15:
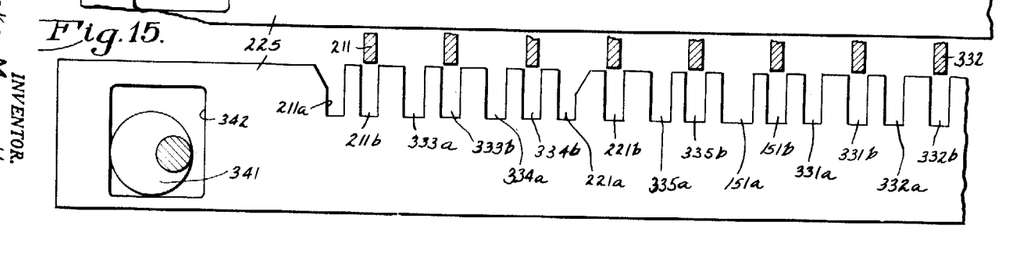

In accordance with one of the more detailed features of the invention, each of the keys 331-335 may be received by an auxiliary notch, thus permitting all of the keys to be freed at the same time. Such auxiliary notches are indicated at 331b-335b, the auxiliary notches being interposed between the normal notches. This condition is illustrated in Fig. 15 and is brought about by rotating the manual control 340 through an additional angle of 90°, thereby moving the locking bar 225 over to the extreme left-hand limit of its range. It will be noted in Fig. 15 that all of the auxiliary notches 331b-335b are in register with their corresponding keys. The freeing of all of the keys is advantageous where it is not necessary to convey both letter and figure intelligence and where maximum flexibility is desired.

Using the above-described locking arrangement, it is possible for certain selected keys to be operative in both the "figures only" and "letters only" conditions illustrated in Figs. 12 and 13. Thus, the space key 151 is provided with a widened normal notch 151a which is in register with the key under both conditions of operation. It will be apparent to one skilled in the art that this feature may be utilized for other keys, for example, the decimal point or period.

In the following claims the term "locking bar" will be understood to include structures in which a single-part locking bar is used, as here, and also structures in which the locking bar is divided for convenience into parts or sections.

What I claim is:

1. In a coding device, the combination comprising a keyboard having a set of data keys, a set of combination bars operatively coupled to said keys for movement when the associated key is operated, a set of code bars engaging said combination bars, said code bars being biased in the same direction and having a latch member for normally restraining them against movement, said bars being notched for movement in a predetermined combination upon moving a selected one of said combination bars, means actuated by said selected combination bar for unlatching said code bars for movement in response to the biasing force, a magnetic recorder, means actuated at the end of the stroke of movement of the selected combination bar for advancing the recorder through one step of movement, means for recording the positions of said code bars seriatim in said recorder during the advancement of the latter, and means actuated at the completion of the advance of said recorder for restoring the code bars to their initial latched positions.

2. In a coding device, the combination comprising a keyboard having a set of data keys, a set of combination bars operatively coupled to said data keys respectively, a set of biased code bars engaging said combination bars, said bars being notched to produce endwise movement of the code bars in predetermined coded combination upon actuation of a selected one of said combination bars, means for normally latching said code bars against movement under the force of bias, a recorder having a single step driving mechanism, means operated at the end of the stroke of the selected combination bar for releasing the latch thereby allowing said code bars to assume their coded positions and for triggering the recorder driving mechanism, means for recording seriatim in said recorder the coded positions of said code bars as the recorder is driven, means operated at the end of the step of recorder movement for restoring said code bars to their latched position, auxiliary latch means for retaining said code bars in their latched position after the normal latching means has been released to allow the bars to assume their coded positions, and means for releasing said auxiliary latch upon restoration of the selected combination bar to its initial position, thereby preventing recycling in said coding device.

3. In a coding device, the combination comprising a keyboard having a set of data keys, a set of combination bars operatively coupled to said data keys respectively, a set of latched code bars engaging said combination bars, a latched release bar, said bars being notched to produce endwise movement of the code bars in predetermined coded combination upon actuation of a selected one of said combination bars, means operated by said release bar for releasing the code bars in said coded combination, a recorder having a single step driving mechanism, means operated at the end of the stroke of the selected combination bar for unlatching the release bar and for triggering the recorder driving mechanism, means for recording seriatim in said recorder the coded positions of said code bars as the recorder is driven, means operated at the end of the step of the recorder movement for restoring said code bars and said release bar to their initial latched positions, and auxiliary latch means for said release bar for latching the same until operating pressure is removed from the selected combination bar.

4. In a coding device, the combination comprising a keyboard having a set of data keys, a set of combination bars operatively coupled to said data keys, a set of biased code bars engaging said combination bars, said code bars and said combination bars being notched to permit endwise movement of said code bars into coded positions, latch means for retaining the code bars in a latched position and for unlatching them as an incident to the selected combination bar reaching the end of its movement, a magnetic recorder having a recording medium and having driving means for driving the same through one step of movement upon said code bars reaching their code positions, and means for recording seriatim on said recording medium the coded positions of said code bars as the medium is driven thereby to form a code group on said recording medium which is representative of data corresponding to the selected combination bar and data key.

5. In a coding device, the combination comprising a keyboard having a set of data keys, a set of combination bars coupled to said data keys for movement thereby, a set of code bars arranged at right angles to said combination bars and with the bars edge-to-edge, means for biasing the code bars, said code bars and combination bars being notched for endwise movement of the code bars in predetermined combination into coded positions representative of a selected combination bar, a biased release bar engaging said code bars and triggered for releasing movement at the end of the stroke of the selected combination bar, a magnetic recorder, a single step driving means actuated by the triggered release bar for driving the recorder, means coupled to said code bars for recording their code positions seriatim in said recorder, each of said combination bars having notches alternatively engageable by the triggered release bar and so arranged that the selected combination bar is locked in its displaced position and the non-selected combination bars in their at-rest positions until the recording is complete.

6. In a coding device, the combination comprising a keyboard having a set of data keys and a space key, means including a recording medium for recording the data entered on said keyboard, single step driving means for advancing the recording medium in step with the operation of said keys, spacing means actuated by said space key for entering a space indicia on said recording medium, printing means coupled to said keys and having a spacing mechanism connected to said driving means for printing the data entered on said keyboard, means including a tab key on said keyboard for disconnecting the recording medium from said driving means and for recycling said driving means for the repeated operation of the spacing mechanism in the printer, and means coupled to said driving means for terminating the recycling and reconnecting the recording medium upon completion of a predetermined number of cycles by said driving means.

7. In a coding device, the combination comprising a keyboard having a set of data keys and a space key, means including a recording medium for recording the data entered on said keyboard, single step driving means for advancing the recording medium step by step in unison with successive operation of said keys, spacing means actuated by one of the keys on said keyboard for entering a space indicia on said recording medium, printing means coupled to said keys and having a stepping mechanism connected to said driving means for operation in unison therewith, thereby to provide a printed record of the data entered on said keyboard, means including a space-out key on said keyboard for recycling including a tab key for disconnecting the recording medium from said driving means and for recycling said driving means for repeated operation of the stepping mechanism in the printer, and means for terminating the recycling and reconnecting the recording medium to said driving means upon completion of a predetermined number of cycles by said driving means.

8. In a coding device, the combination comprising a keyboard having a set of data keys, a set of combination bars operatively coupled to said keys, a set of code bars engaging said combination bars and arranged to be released in a predetermined combination by a selected one of said data keys, a set of switches each connected to a respective one of said code bars for individual operation when the associated bar is released, a collector having a plurality of inputs and an output, each one of said switches being connected to a respective one of said inputs, said collector including a cycling means for successively coupling said output with each of said inputs so as to produce at the output a code group of successive voltage impulses in accordance with the setting of said switches during a single cycle, recording means including a record medium and a single recording head responsive to voltage impulses, said head being coupled to the output of said selector, said means and said head being relatively movable, and means including a single revolution clutch actuated upon operating the selected one of said keys for driving the collector through one operating cycle while simultaneously advancing said recording medium relative to said head through one step of movement for the recording of the code group on said record medium.

9. In a coding device, the combination comprising a keyboard having a set of data keys, a set of combination bars operatively connected to said data keys, a set of code bars arranged at right angles to said combination bars, said bars being notched for movement of certain ones of said code bars endwise into an alternate position, a voltage source, a plurality of two-condition switches connected to said voltage source, each one of said switches being operatively coupled to a respective one of said code bars, a collector having a plurality of contact elements and having output means movable through a cycle wherein each of said contact elements is successively engaged, each of said contact elements being connected to a respective one of said switches, a recorder having both a magnetic recording medium and a single recording head coupled to the output means of said collector, advancing means for relatively moving said head and said medium step-by-step along a path, and single-step driving means actuated by said selected combination bar for driving said collector through a cycle while simultaneously operating said advancing means so that the spots of magnetism are recorded in sequence along said path to form a code group which is representative of the selected data key on said keyboard.

10. In a coding device, the combination comprising a keyboard having a set of data keys, a set of combination bars operatively coupled to said keys, a set of latched code bars engaging said combination bars, each of said bars being notched so that the code bars are unlatched for movement endwise into an alternate position in predetermined combination depending upon the combination bar which is selected, a voltage source, a plurality of two-condition switches connected to said voltage source, each one of said switches being operatively coupled to a respective one of said code bars, a collector having two contact elements connected to each of said switches respectively, said switches being effective to reverse the polarity of the contact elements associated therewith, said collector having an output element movable through a cycle for successively engaging each of said contact elements one at a time, a recorder having both a recording medium movable step-by-step and a recording head adjacent said medium connected to the output element of said collector, means including a single revolution clutch triggered upon movement of the code bars to their cooled positions for driving the output member of said collector through its cycle while simultaneously advancing the recording medium through one step of movement, and means operated during the latter portion of movement of the single revolution clutch for restoring the code bars to their initial latched position.

References Cited in the file of this patent

UNITED STATES PATENTS

| | | |
|---|---|---|
| 2,052,861 | Zur Nieden | Sept. 1, 1936 |
| 2,114,296 | Green | Apr. 19, 1938 |
| 2,298,939 | Griffiths et al. | Oct. 13, 1942 |
| 2,320,637 | Modigliani | June 1, 1943 |
| 2,345,137 | Long | Mar. 28, 1944 |
| 2,436,229 | Reiber | Feb. 17, 1948 |
| 2,492,584 | Kogler et al. | Dec. 27, 1949 |
| 2,534,494 | Zenner | Dec. 19, 1950 |
| 2,546,829 | Mallina | Mar. 27, 1951 |
| 2,560,474 | Potts | July 10, 1951 |
| 2,563,355 | Murray | Aug. 7, 1951 |
| 2,566,931 | Cunningham et al. | Sept. 4, 1951 |
| 2,599,392 | Kille | June 3, 1952 |
| 2,614,169 | Cohen | Oct. 14, 1952 |
| 2,628,346 | Burkhart | Feb. 10, 1953 |
| 2,633,966 | Kloski et al. | Apr. 7, 1953 |
| 2,696,420 | Roth | Dec. 7, 1954 |
| 2,717,686 | Seeber | Sept. 13, 1955 |
| 2,735,491 | Frost | Feb. 21, 1956 |